United States Patent [19]

Barr et al.

[11] Patent Number: 4,605,157

[45] Date of Patent: Aug. 12, 1986

[54] DRILL BIT MANUFACTURING METHOD

[75] Inventors: John D. Barr, Cheltenham; Haydn R. Lamb, Gloucester, both of United Kingdom

[73] Assignee: NL Industries, Inc., New York, N.Y.

[21] Appl. No.: 575,555

[22] Filed: Jan. 31, 1984

[51] Int. Cl.$^4$ .......................................... E21B 10/58
[52] U.S. Cl. ............................ 228/132; 228/245; 228/257; 76/108 A
[58] Field of Search ............... 228/132, 134, 139, 257, 228/245, 212, 244; 175/410, 411, 329; 76/108 R, 108 A

[56] References Cited

U.S. PATENT DOCUMENTS

| | | | |
|---|---|---|---|
| 3,052,310 | 9/1962 | Kinzbach | 175/410 X |
| 3,078,551 | 2/1963 | Patriarca et al. | 228/134 X |
| 3,279,047 | 10/1966 | Cumberland | 228/257 X |
| 4,073,354 | 2/1978 | Rowley et al. | 175/329 |
| 4,271,917 | 6/1981 | Sahley | 175/410 |
| 4,334,585 | 6/1982 | Upton | 76/108 A X |
| 4,350,215 | 9/1982 | Radtke | 76/108 A X |

FOREIGN PATENT DOCUMENTS 415221  8/1934  United Kingdom ............... 228/214

Primary Examiner—Nicholas P. Godici
Assistant Examiner—Carmine Cuda
Attorney, Agent, or Firm—Browning, Bushman, Zamecki & Anderson

[57] ABSTRACT

The invention comprises a method of mounting a cutter, having a stud portion defining one end thereof and a cutting formation generally adjacent the other end, in a pocket in a drill bit body member. The method includes the steps of forming a channel extending into the pocket, inserting brazing material into the channel, inserting the stud portion of the cutter assembly into the pocket, then heating the bit body member to cause the brazing material to flow through the channel into the pocket, and finally re-cooling the bit body member. During the assembly of the various pieces required in the steps mentioned immediately above, a spring is used, cooperative between the cutter and the bit body member, to retain the stud portion in the pocket and also to displace the stud portion toward the trailing side of the pocket.

23 Claims, 10 Drawing Figures

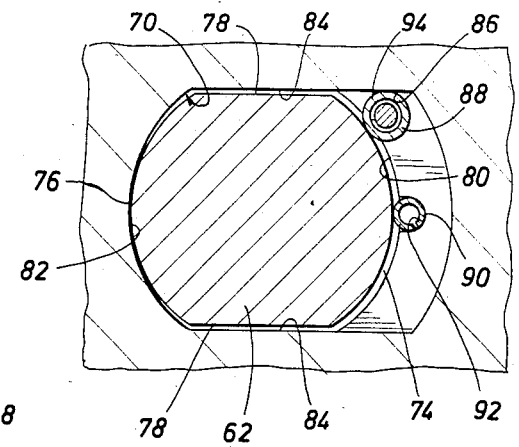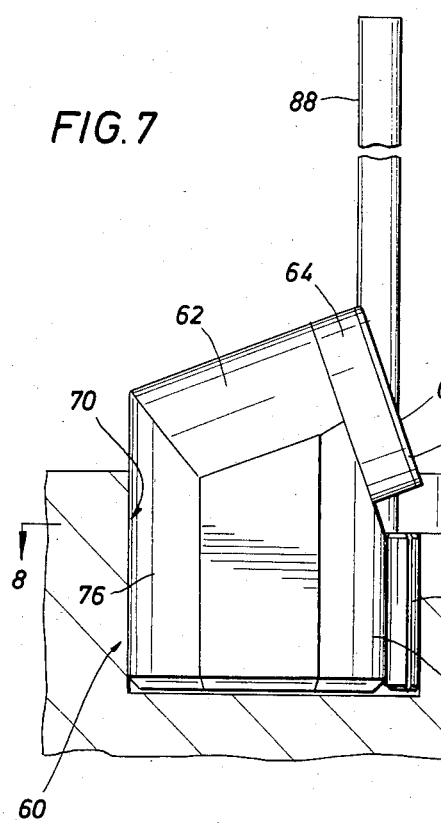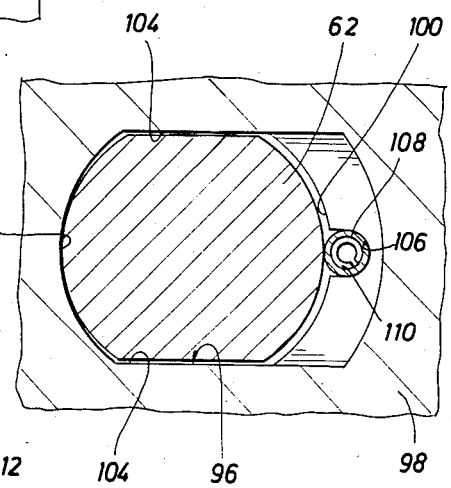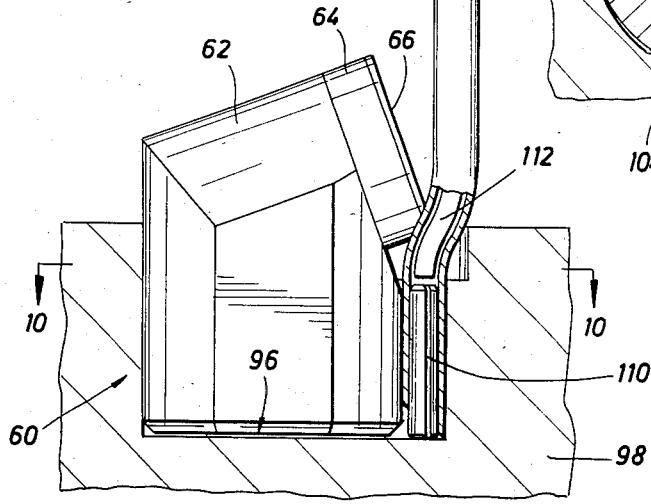

DRILL BIT MANUFACTURING METHOD

BACKGROUND OF THE INVENTION

The present invention pertains to the manufacture of drill bits, and especially to drag-type bits of the type wherein a number of relatively small cutter devices or cutters are brazed into a bit body. Such drag-type bits, which may be either full bore or core type, typically have bit bodies comprised of one or more body members either of steel or of a tungsten carbide matrix material. Brazing may be used as a means of mounting cutter devices in either type of bit body. However, since it is relatively easy to interference fit the cutter devices into a steel bit body using more or less conventional techniques, but is difficult to achieve such interference fits with matrix bit bodies, the present invention may, in that sense, be considered especially suitable for the manufacture of matrix body bits.

More specifically, the cutter devices to be mounted on the bit body each typically comprise a mounting body or "post" including a stud portion to be mounted in a respective pocket in a bit body member and defining one end of the cutter device. The cutter device has a cutting formation generally adjacent the other end of the mounting body or post. Even more specifically, the post may be comprised of sintered tungsten carbide, and the cutting formation may be defined by a layer of polycrystalline diamond material carried on the post, either directly or via an intermediate carrier member, e.g. a disc of sintered tungsten carbide. However, the present invention could be applied to other forms of cutters, e.g. monolithic bodies.

A number of problems have been associated with past techniques for brazing such a stud portion into its respective pocket in the bit body member. For various reasons, there have been instances in which the braze material has not completely filled the void areas or space between the stud portion and the pocket. This may render the resulting product more susceptible to breakage or failure in use.

In most bit designs, each cutter device and its respective pocket has a forward or leading side, which can be determined from the direction in which the bit will rotate in use, and on which leading side the aforementioned cutting formation is generally located. The opposite side of the cutter device and pocket may be considered the rear or trailing side. In use, high forces are exerted on the cutter in a forward to rear direction. Thus, the aforementioned failures and breakages are a particular problem if there is a gap, unfilled by braze material, between the pocket and the stud portion of the cutter device at the trailing side and near the mouth of the pocket.

These and other problems are at least partially due to the fact that, as a bit body member, with cutter studs emplaced at various pockets, is heated during the brazing process, the exterior heats faster than the interior. Thus, a temperature gradient is established with temperature decreasing inwardly from the exterior of the bit body.

It is not practicable to completely fill the void areas between each cutter stud portion and its respective pocket with braze material prior to heating. Because the heating is preferably done in a controlled, i.e. reducing, atmosphere in a closed chamber, a human operator cannot add to or manipulate the brazing material as it is heated. Thus, a body of brazing material, e.g. in the form of a ring surrounding the cutter, has been placed adjacent the mouth of the pocket prior to heating. In some cases, a thin strip of brazing material was also placed in the pocket in an effort to define a flow path tending to draw brazing material from the main body down into the pocket.

With such a technique, when the main body of brazing material at the mouth of the pocket reaches its melting point, it may begin to flow downwardly into the pocket, but due to the aforementioned temperature gradient, may refreeze before it reaches the bottom of the pocket and completely fills the void areas. Even if the material is able to flow all the way to the bottom of the pocket, it is still difficult to ensure that it will completely fill all the void areas across the bottom of the pocket and about the sides of the stud portion of the cutter. These problems may be aggravated by the fact that, if the body of brazing material adjacent the mouth of the pocket reaches its melting point but does not flow into the pocket, the more volatile components of the brazing material may evaporate, thus raising the melting point of the remainder, and perpetuating the aforementioned problem caused by the temperature gradient.

Still another problem is that the brazing material which is placed near the mouth of the pocket may run off across the face of the bit body member, and be wasted, rather than flow into the pocket.

Yet another problem is that, even if the void areas between the stud and pocket are completely filled by braze material initially, this material may be eroded away by the drilling fluid in use. Once again, creation of a gap near the mouth of the pocket on its trailing side is particularly disadvantageous.

Another somewhat different problem is that of providing a simple, yet effective means of temporarily retaining the stud portion of the cutter assembly in its pocket while the brazing is performed. In some cases, where it has been possible to get a substantial amount of brazing material to enter the pocket, the molten brazing material may tend to push the stud portion outwardly from the pocket with a sort of "percolating" effect.

SUMMARY OF THE INVENTION

In accord with the present invention, there is provided an improved brazing method which is much more reliable in ensuring that the void areas between the stud portion of the cutter and its pocket are virtually completely filled by braze material, and without spillage of the braze material over the face of the bit body. Further, there is provided a very simple, but nevertheless highly effective means of temporarily retaining the stud portion in the pocket during the brazing procedure, and in addition, this means may also be used to displace the stud portion toward the trailing side of the pocket, thereby minimizing or eliminating the void areas on such trailing side, which in turn helps to assure that the stud portion is well supported in this crucial area.

More specifically, in accord with the present invention, a channel means is formed extending into the pocket, e.g. adjacent a side wall thereof. Brazing material, which may include braze metal proper and flux, is inserted into the channel means. The stud portion of the cutter assembly is also inserted into the pocket. In preferred forms of the invention, an integral tube may be used to form the channel means, and furthermore, it may be preferable to first insert the stud portion of the cutter assembly into the pocket, next insert the brazing material into the tube, and then insert the tube into the pocket. In any event, after these parts have been assembled as described, the bit body member in which the pockets are formed is heated to cause the brazing material to flow through the inner end of the channel means into the pocket, whereafter the bit body is re-cooled.

In the preferred forms of the invention, the tube which forms the channel means has an inner portion which is inserted into the pocket to a point near its bottom wall, and an outer portion which is allowed to extend out of the pocket away from the bit body member for a substantial distance. For the heating portion of the process, the bit body member and tube are oriented so that at least a substantial part of said outer portion extends generally upwardly during such heating. In practice, since a plurality of cutter devices, having different orientations, are simultaneously heated and thereby brazed into the bit body member, each utilizing a respective such tube, the outer portions of at least some of the tubes may be bent at suitable angles so that substantial parts of the outer portions of all of the tubes are generally parallel to one another, extending upwardly, as the bit body member is oriented in the furnace during heating.

The tube confines the brazing material until the bit body member has been heated sufficiently to raise the temperature to the melting point of the brazing material near the bottom of the pocket. The column of molten brazing material in the aforementioned upwardly extending part of the outer portion of the tube provides a hydraulic head which forces the molten brazing material to flow out through the inner end of the tube. Thus, the molten braze material first enters into direct contact with the pocket near the bottom thereof, and again due to the pressure exerted by the aforementioned hydraulic head, will tend to flow across the bottom of the pocket and up along its sides through the void areas between the pocket walls and the stud portion of the cutter.

The aforementioned means for temporarily retaining the stud portion in the pocket, and displacing it toward the trailing side, is preferably in the form of a spring cooperative between the cutter device and the bit body member. The spring is preferably located in the pocket. More specifically, when the pocket is formed in the bit body member, it may be formed with an offset recess distal the trailing side of the pocket, and the spring may be installed in this offset recess. Even more specifically, the spring may be in the form of a roll pin cast into the bit body member during formation thereof. In such instances, the roll pin is oriented generally parallel to the pocket.

The tube is inserted in such a way as not to prevent contact of the stud portion of the cutter device with the wall of the pocket generally on the trailing side thereof under influence of the roll pin. Many conventional cutter devices have pre-formed longitudinal grooves along their trailing sides, intended for use as keyways. With this form of cutter device, it is particularly advantageous to utilize the pre-existing keyway to receive the tube without preventing such contact. The pocket may be formed with an opposed groove for also receiving part of the tube while so allowing contact. After brazing, the outer portion of the tube and any brazing material left therein are cut away adjacent the mouth of the pocket. The inner portion of the tube and the braze material therein remain in place in the finished bit and provide back support across the grooves.

In an improved form of cutter device, disclosed herein, wherein the need for such a keyway is eliminated, the pocket in the bit body member may be formed with a recess distal the trailing side of the pocket, and the tube may be inserted in such recess. Separate such offset recesses may be provided for the tube and roll pin, or alternatively, a single recess may be provided, with the roll pin being emplaced in the inner end of the tube.

Accordingly, it is a principal object of the present invention to provide an improved method of mounting a cutter device in a pocket in a drill bit body member by introducing the braze material via pre-formed channel means.

Another object of the present invention is to provide an improved method of mounting a cutter device in a pocket in a drill bit body member wherein the stud portion of the cutter device is displaced toward the trailing side of the pocket during brazing.

Still another object of the present invention is to provide a method of mounting a cutter device stud portion in a pocket in a drill bit body member wherein spring means are installed cooperative between the cutter device and the bit body member for retaining the stud portion in the pocket during brazing.

Still other objects, features and advantages of the invention will be made apparent by the following detailed description, the drawings and the claims.

BRIEF DESCRIPTION OF THE DRAWINGS

FIG. 7 is a view similar to that of FIG. 6 illustrating a second embodiment of the invention.

FIG. 8 is a transverse cross-sectional view taken along the line 8—8 of FIG. 7.

FIG. 9 is a view similar to that of FIG. 7 illustrating a third embodiment of the invention.

FIG. 10 is a transverse cross-sectional view taken along the line 10—10 of FIG. 9.

DETAILED DESCRIPTION

Figure 1:
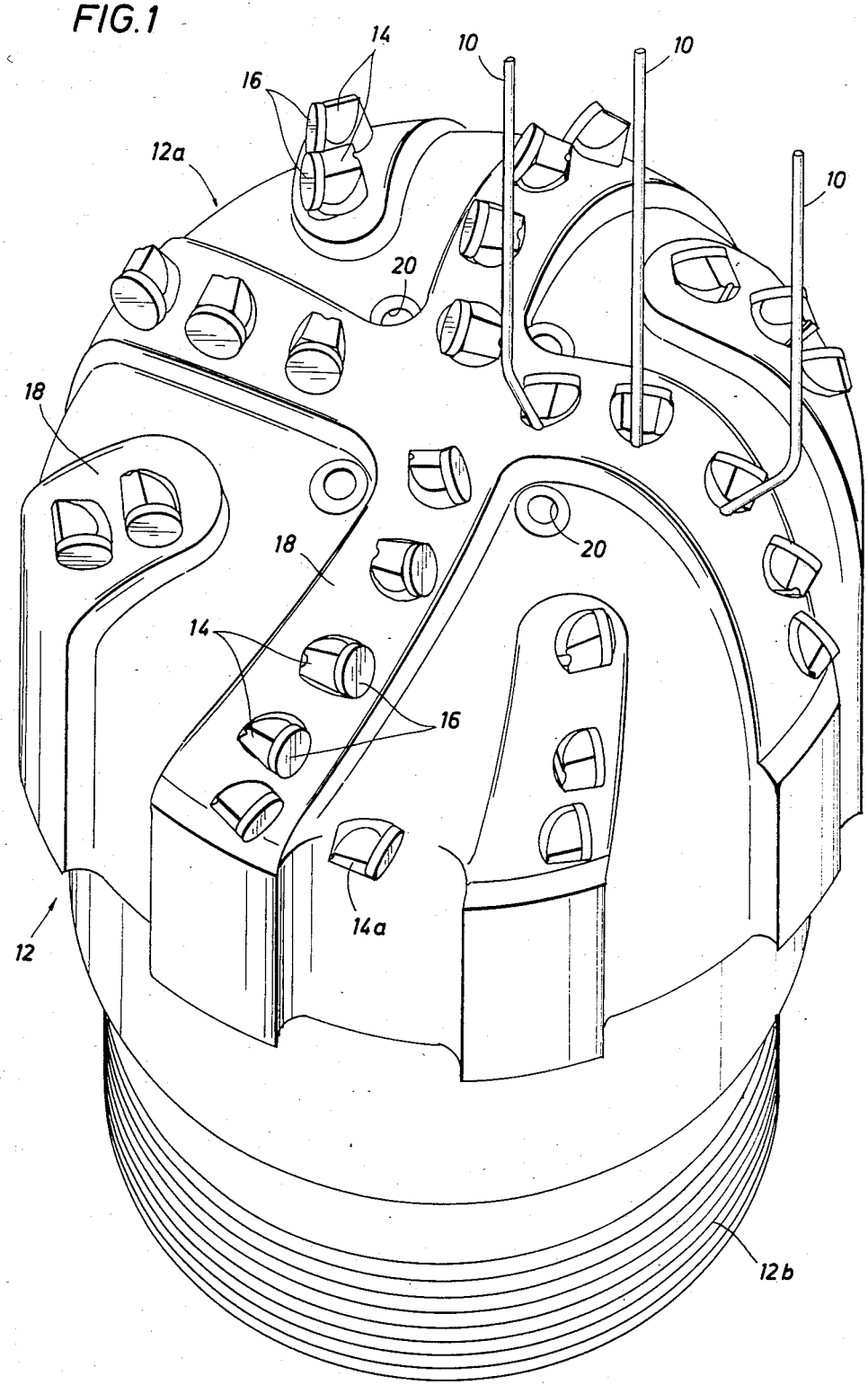
FIG. 1 is a perspective view of a drill bit crown during manufacture in a state of partial preparation for heating.

FIG. 1 shows the crown of a representative drill bit in process of manufacture. The exemplary bit shown is a full bore, drag-type drill bit. However, the method described hereinafter may also be applied to the manufacture of corehead type bits, and possibly also to roller cone bits.

While FIG. 1 is intended to represent the bit crown during the manufacturing process, for reasons which will become more apparent hereafter, the finished bit crown will be much the same in appearance as that shown in FIG. 1, except that tubes 10 will have been removed.

More specifically, the bit comprises a bit body member 12. Bit body member 12 is described hereinafter as comprised of a tungsten carbide matrix material. However, it should be understood that, if it were desired to mount cutter devices in a steel bit body by brazing, the method of the present invention could likewise be applied to a steel-bodied bit, or indeed to a bit body of any other suitable material.

Bit body member 12 is termed the "crown" of the total bit body and includes, generally at one end, a working face 12a, and at the other end, a threaded connection 12b whereby the other piece of the bit body, known as the "shank," can eventually be connected to the crown 12. As is well known in the art, the shank portion of the bit body, which may be threaded then welded to the crown 12, includes a threaded pin whereby the finished bit can be connected to drill pipe. FIG. 1 illustrates the bit crown as it would be oriented during the brazing process, i.e. with the working face 12a uppermost, but as well known in the art, the orientation would be reversed in use.

The bit further includes a plurality of cutter devices or assemblies 14 mounted on the bit body, and more specifically on the working end 12a of the crown 12. Each of the devices 14 includes a cutting face 16 which extends outwardly from the working face 12a of the bit body member or crown 12. Each device 14 is oriented with respect to the bit body so that it will tend to scrape into the earth formation in use as the bit is rotated in its intended direction. Thus, the cutting faces 16 may be said to be located on the forward or leading sides of their respective devices 14, and the opposite sides of those devices may be considered the trailing sides. Most of the cutter devices 14 are arranged in rows along upset areas or ribs 18 of the working face 12a of the bit body members 12. However, some of the cutter devices, which may be termed "gauge cutters," and which are denoted by the numeral 14a, are mounted in inset portions of working face 12a. A number of circulation ports 20 open through working face 12a, near the center thereof. Drilling fluid is circulated through these ports in use, to wash and cool the working end of the bit and the devices 14.

Figure 2:
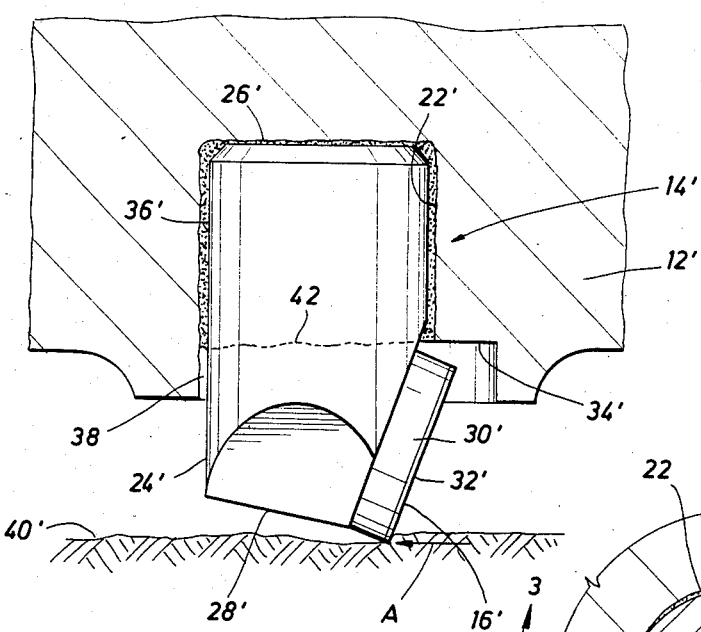
FIG. 2 is a detailed longitudinal view, partly in section and partly in elevation, showing a single prior art cutter assembly and an adjacent portion of the bit body in use.

Each of the devices 14 has a stud portion which is brazed into a respective pocket in the bit body member 12. Referring to FIG. 2, there is shown a more or less conventional cutter device 14' which has been brazed into a pocket 22' in a bit body 12'. The cutter device or assembly 14' comprises a mounting body or post 24'. The portion of post 24' which is to be brazed into pocket 22' is generally cylindrical, and will be referred to herein as the "stud portion" of post 24'. This stud portion defines one end 26' of the post 24' and of the device 14' generally, specifically that end which is disposed innermost in pocket 22'.

The other end, 28' of post 24' and device 14' generally, protrudes outwardly from the bit body member 12. Adjacent end 28', and on the leading side of post 24', there is bonded a carrier member in the form of a disc 30' of sintered tungsten carbide. On the leading side of disc 30' there is applied a layer 32' of cutting material, comprised of polycrystalline diamond, which defines the cutting face 16' of the device. Pocket 22' has a shallow cavity 34' on its leading side for receipt of the inner part of disc 30' and layer 32'.

As shown in FIG. 2, and as sometimes occurs in the prior art, the braze material 36' has not completely filled all the void areas between post 24' and pocket 22', and in particular, there is a gap 38 near the mouth of pocket 22' and on the trailing side thereof. Such a gap can also be formed by erosion of the braze material in use. A gap in this particular location can easily result in breakage and failure. When the device is in use cutting an earth formation 40' as shown, a large force is exerted on the device in the direction of arrow A. Thus, it can be seen that it is advantageous to provide as much support as possible along the trailing side of post 24'. It has been found that prior art devices as shown in FIG. 2, and in particular having a gap 38, tend to crack and break off along a line such as 42 generally intersecting the juncture between gap 38 and bracing material 36'.

In other instances, not illustrated, the brazing material does not reach and fill the innermost parts of pocket 22 due to the temperature gradient described hereinabove or other reasons.

Figure 4:
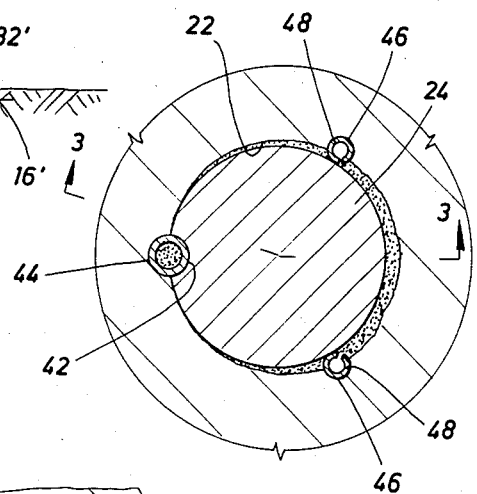
FIG. 4 is a transverse cross-sectional view taken along the line 4—4 in FIG. 3.
Figure 3:
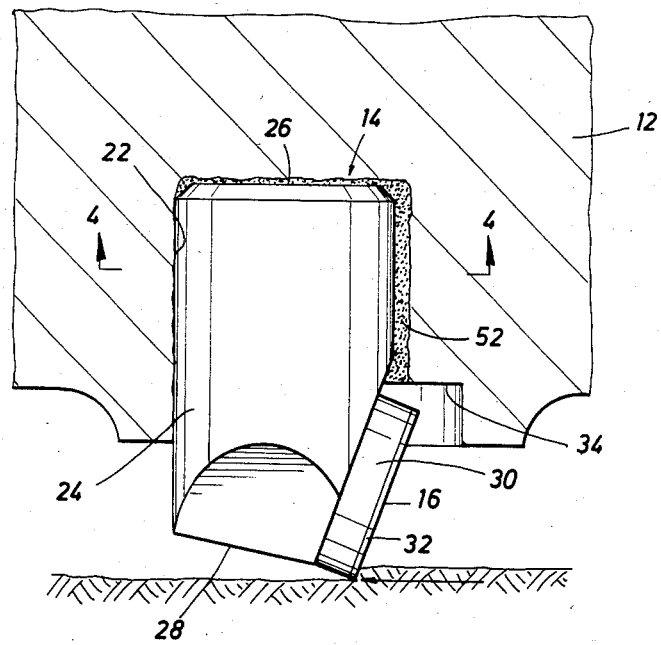
FIG. 3 is a view similar to that of FIG. 2 taken along the line 3—3 in FIG. 4, but showing a cutter assembly which has been brazed into a bit body in accord with the method of FIG. 1.
Figure 5:
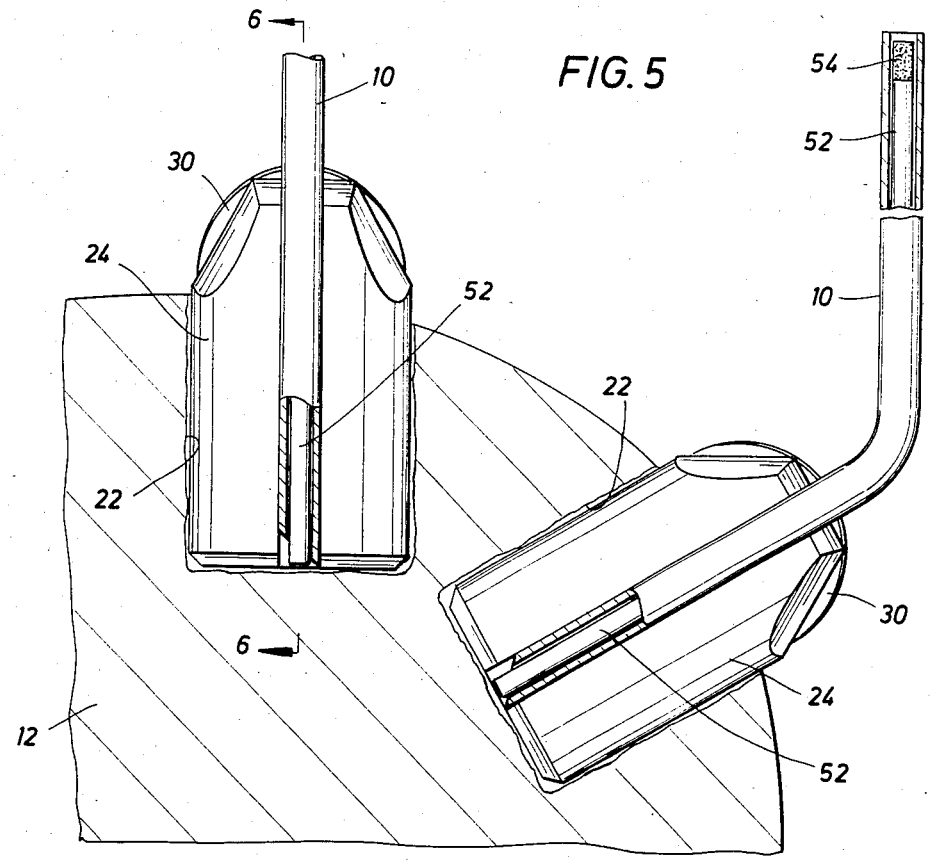
FIG. 5 is a detailed view, partially in section and partially in elevation, of the apparatus of FIG. 1 and showing the manner in which various parts are assembled prior to heating.
Figure 6:
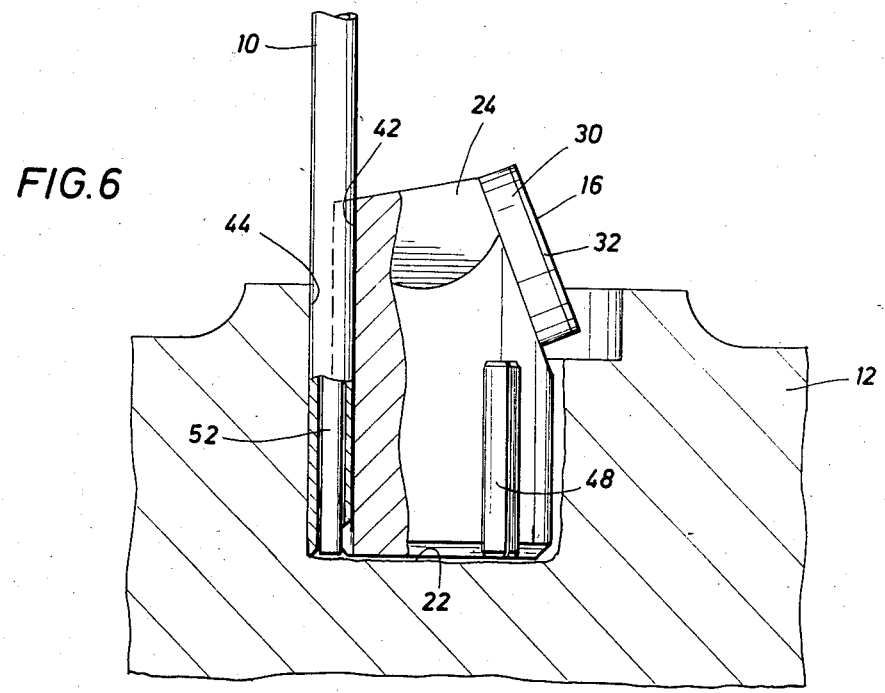
FIG. 6 is a view taken along the line 6—6 of FIG. 5.

Referring now to FIGS. 5 and 6 in conjunction with FIG. 1, an improved brazing method will be described, and further referring to FIGS. 3 and 4, the finished product can be compared with the prior art illustrated in FIG. 2. The cutter devices 14 and 14a illustrated in FIGS. 1 and 3–6 are generally of the same form as the device 14' of the prior art, this general type of cutter device being readily commercially available.

Briefly, each of the devices 14 comprises a post or mounting body 24 defining the stud portion of the device and its end 26. Adjacent the other end 28, and on its leading side, post 24 mounts a carrier member 30 on which is disposed a layer 32 of hard cutting material defining cutting face 16. In a typical commercially available cutter device, post 24 and carrier member 30 are comprised of sintered tungsten carbide, while layer 32 is comprised of polycrystalline diamond material.

In the center of the trailing side of post 24, there is formed a longitudinal groove 42. Ordinarily, this groove would serve as a keyway, and specifically, would receive a small protuberance or key formed in the pocket of the bit body so as to properly orient the device 14 with its cutting face 16 aligned with the leading side of the pocket. As will be explained more fully below, in accord with the method of the present invention, the slot 42 may continue to serve this keying function while further providing a site for receipt of the channel means of the invention.

Each of the devices 14 or 14a, in accord with the present method, has its stud portion, defined by post 24 adjacent end 26, mounted in a respective pocket 22 in bit body member 12. Each pocket 22 has, on its leading side, a cavity 34 for receipt of the innermost portion of disc 30 and layer 32.

When the bit body member 12 is formed, e.g. by particulate molding processes well known in the art, each pocket 22 is formed with three small recesses extending generally radially outwardly therefrom. One such recess or groove 44 is located in the center of the trailing side of the pocket. Two other recesses 46 are located generally at the laterally outer extremities of the leading side of the pocket (see FIG. 4).

In one preferred form of the invention, a pair of springs in the form of roll pins 48 are pre-emplaced in respective recesses 46 so that they extend generally parallel to the length of pocket 22. Although recesses 46 could be pre-formed by other means, roll pins 48 can, in fact, be cast into the bit body member 12 during its formation so that roll pins 48 actually serve as the mold plugs which form recesses 46. A filler of clay or other soft, temperature-resistant material is temporarily disposed in the interior of each roll pin 48 to prevent infiltration by the hard material of the bit body. The filler is later blasted away so that the roll pin is free to resiliently flex in a generally radial direction with respect to pocket 22.

To prepare the bit crown for heating, a number of parts are assembled. A typical order of assembly of the parts will be described, but it should be understood that the order of assembly of parts could be varied. Thus, for example, the roll pins 48 either will have been cast into the bit body member, as described above, or will be emplaced in pre-formed recesses 46. At this point, it is noted that while a roll pin is normally inserted in bores transverse to two surfaces to be held against relative movement, with the radial resilience of the roll pin merely being used to retain it in the bores, in this case, the roll pins are emplaced parallel to the pocket 22 and the post 24. Then, when the post 24 is inserted in the pocket, the radial resilience of the roll pins serves to temporarily retain the post in the pocket.

More specifically, the stud portion of post 24 and the pocket 22 are cleaned and coated with flux. A thin disc (not shown) of braze metal coated with flux, or a layer of flux/braze metal paste, may be placed in the bottom of pocket 22 to prime the flow of brazing material. The post 24 is then inserted in the pocket 22 with its groove 42 opposed to the groove 44 of the pocket. If necessary, a temporary removable key (not shown) can be emplaced in the pocket 22 so that it will be partially received in each of the grooves 42 and 44 to be sure that the cutter device 14 is properly oriented in the pocket, with its cutting face 16 on the leading side.

The roll pins 48, due to their radial resilience, tend to protrude slightly from their recesses 46 into the large central portion of pocket 22. Thus, they will abut post 24 to temporarily retain it in the pocket. Furthermore, the roll pins 48 are displaced or offset about the circumference of pocket 22 from the trailing side thereof by a distance sufficient that they oppose surfaces of post 24 which face at least partially forward, and their force against post 24 has a component of direction extending toward the rear or trailing side of the pocket. Thus, they will not only retain the post in the pocket, but will further displace it toward the trailing side of the pocket as shown in FIGS. 3 and 4 to minimize, or even eliminate, space between the post 24 and the pocket 22 along the trailing side. Note, in particular, that such space is virtually eliminated immediately adjacent grooves 42 and 44.

Because many conventional cutter devices are already provided with grooves 42, then by the fairly simple expedient of providing an opposed groove 44 in pocket 22, it is possible to provide a convenient site for formation of the brazing channel without interfering with contact of the post 24 and the wall of pocket 22 generally at the trailing side.

The channel is preferably formed from an integral tube 10, preferably comprised of a non-corrosive material having a significantly higher melting point than the brazing material to be used. Brazing material is inserted in the tube 10, preferably before assembly of tube 10 with the other parts to be heated. Such brazing material, as defined for purposes of this application, may comprise a brazing metal proper, which could be an alloy or a pure metal, as well as a flux material. At least one end of tube 10, destined to become the "inner" end when the parts are assembled, is beveled, to preclude the possibility that it might seal against the bottom of the pocket after insertion therein and prevent proper flow of the brazing material. A small quantity of flux is emplaced in the other or "outer" end of the tube, followed by a wire or rod of brazing metal, which may have its exterior coated with flux in the well known manner. Rod 52 is pushed through tube 10 so that it extends to a point near the inner end of the tube, and finally, a small body 54 of flux material is emplaced in the outer end of the tube 10.

If a temporary key has been emplaced in opposed grooves 42 and 44, it is now removed. Tube 10 is then inserted into pocket 22, and specifically into opposed grooves 42 and 44, and forced inwardly until its inner end, i.e. the end in the pocket, reaches a point near the bottom wall of the pocket as shown in FIGS. 5 and 6. The tube 10 is sized so that, with its inner portion thus properly positioned in pocket 22, an outer portion will extend outwardly away from bit body member 12 by a substantial distance. With the bit body member 12 positioned as it will be placed in the furnace, i.e. in the position shown in FIG. 1 with its working face 12a uppermost, the outer portion of the tube 10, along with the rod 52 therein are bent so that a substantial part of the outer portion of the tube will extend generally vertically upwardly.

This assembly procedure is repeated for each of the respective pockets 22 and devices 14 or 14a. FIG. 1 shows the apparatus in a stage wherein all devices 14 and 14a have been emplaced in their respective pockets, and several of the tubes 10 have been emplaced and bent as needed. It is noted that, for at least some of the tubes 10, depending upon the orientation of their respective cutter devices 14, there may be little or no bending necessary. For example, referring to FIG. 5, the tube 10 on the right must be bent considerably so that a substantial part of its outer portion extends vertically upwardly. However, for the assembly on the left side of FIG. 5, due to the orientation of post 24, the outer part of tube 10 is already oriented generally vertically upwardly parallel to the bent portion of the tube 10 on the right.

When all of the cutter devices 14 or 14a with their respective tubes 10 encasing brazing material, have been assembled, the assembly is placed in a furnace and heated in a reducing atmosphere to at least the melting point of the brazing material. During the heating process, the tubes 10 will confine the brazing material so that, when the brazing material in the outer portions of the tubes begins to melt, but the material near the inner ends of the tubes is still solid, the liquid portion will not flow over the face of the bit body member and be wasted. Furthermore, the confinement or surrounding of the brazing material by the tube 10, along with the presence of body 54 of flux in the upper end of the tube, minimizes evaporation of the more volatile metal components of the brazing alloy.

Once a temperature greater than or equal to the melting point of the brazing material has been reached at the bottoms of pockets 22, the brazing material may begin to flow. Because the outer portions of tubes 10 each have substantial parts extending vertically upwardly, a hydraulic head is established in each tube tending to urge the molten brazing material out through the inner end of the tube across the bottom wall of the pocket 22 and up along its side walls, filling virtually all significant void areas or gaps. Since there is also a capillary effect within the tubes 10 tending to resist such inward flow, the tubes should be sized to allow sufficient length in their vertically upstanding portions so as to provide an adequate hydraulic head to overcome such capillary effect and force the brazing material out through the inner end of the tube and through the void areas between the pocket and cutter post. Also, it is desirable to ensure that the length of rod 52 is such that more than enough braze material to fill the void areas is provided, and this further helps to ensure complete filling of those areas.

Next, the assembly is re-cooled, and finally removed from the furnace. Then, the outer portions of tubes 10 are cut off adjacent the mouths of pockets 22. The inner portions of the tubes, as well as the roll pins 48, are simply left in place in the finished bit crown, as shown in FIG. 4. As shown in FIG. 3, the finished brazed assembly results in a structure wherein the trailing side of the post 24 is well supported, largely by direct abutment with the wall of pocket 22, along the entire length of its trailing side, and the void areas or gaps between the post 24 and the walls of pocket 22 have been filled with braze material 52. The inner remnant of tube 10 with the braze material therein provides further back support across grooves 42 and 44.

The foregoing describes the method in conjunction with a more or less conventional cutter device 14. In FIGS. 7-9, there are shown two variations of the method, specifically adapted for use with an improved form of cutter device, and even more specifically, an improved form of cutter post.

Like the devices 14 described hereinabove, the cutter device 60 illustrated in FIGS. 7-10 is generally comprised of a post 62 having a stud portion adapted to fit into a respective pocket 70 in a bit body member 72 and defining one end of the device 60. At the other end of the post, which extends outwardly from the pocket 70, and on the leading side thereof, there is mounted a carrier member 64, which in turn has on its leading side a layer 66 of hard cutting material defining a cutting formation or cutting face 68. Unlike the previously described cutter devices, device 60, and more specifically its post 62, has been modified in a manner best described in terms of its transverse cross-sectional configuration as shown in FIGS. 8 and 10.

Specifically, in making the mounting body or post 62 for the device 60, a workpiece body is formed with a cylindrical stud portion adjacent one end. The other end is formed in a more or less conventional manner to receive and support the carrier member 64. Subsequently, the cylindrical stud portion of the workpiece body is machined on two diametrically opposed sides to reduce the transverse dimension of the stud portion therebetween. More specifically, the cylindrical stud portion of the workpiece body is machined with two diametrically opposed flats to form the stud portion of the finished mounting body or post 62.

The resulting finished structure, as shown for example in FIG. 8, comprises two diametrically opposed concentric arcs 74 and 76, convex outwardly, and a pair of diametrically opposed rectilinear connector sections 78 interconnecting arcs 74 and 76, as the device is viewed in cross section. Sections 78, as shown, are flat. Alternatively, they could be slightly convex or concave, e.g. due to the shape of the machining tool and/or other factors, but if arcuate, they should have greater radii than arcs 74 and 76. Arc 74 is coincident with what will be termed the "forward" side of the post 62, which in turn is generally coincident with its leading side. Arc 76 defines the rear or trailing side, and flats or connector sections 78 define the "lateral" sides.

The radius of arcs 74 and 76 is chosen so as to give the maximum transverse dimension in the forward-to-rear direction, i.e. between arcs 74 and 76, which is considered practicable for the given bit design. This maximizes the strength of the post 62 in the crucial forward-to-rear direction. Then, by reducing the transverse dimension between the lateral sides of the post 62, it becomes possible to place the devices in a given row on the bit body closer together and/or to include more cutter devices in such a row. The flat configuration of lateral sides 78 is especially salient in eliminating thin, weak spots in the material of the bit body between adjacent cutters while still allowing a relatively large number of cutters per row.

The provision of the flats 78 further provides a means whereby the stud portion defined by the post 62 may be properly indexed or positioned in the pocket 70, without the need for a keyway (such as slot 42 in the foregoing description), which could further weaken the post 62. Instead, it is merely necessary to form the pocket 70 with a matching cross-sectional configuration, comprised of forward and rear opposed arcs 80 and 82 and lateral opposed flats 84.

It is particularly noted that it is relatively easy and inexpensive to form the preliminary workpiece body, of which post 62 is subsequently formed, with a cylindrical stud portion, by conventional techniques such as powder metallurgy molding, to fairly close dimensional tolerances. It is then likewise a fairly simple matter to machine the flats 78, likewise to fairly close tolerances.

It is also noted that other variations are possible. For example, the radius of the original cylindrical workpiece stud portion could be made even larger than that corresponding to the maximum forward-to-rear dimension considered practical for the particular bit design, and flats could be machined on the forward end or rear side of the workpiece stud portion, in addition to the lateral sides. In other variations, a single flat, e.g. on one lateral side, may be used. In any event, by beginning with a cylindrical workpiece stud portion, and then machining, close tolerances can be achieved relatively easily and cheaply.

FIGS. 7 and 8 illustrate a first embodiment of the previously described brazing method for use with the improved post configuration. Since the stud portion of the post 62 has no keyway or other concavity, pocket 70 is provided with a recess 86, formed during preliminary manufacture of the bit body member 72, which is sized and configured to receive virtually the entire thickness of the brazing tube 88. Although the recess 86 could be located virtually anywhere about the periphery of pocket 70 if properly sized, it is preferable that pocket 86 be spaced from the rear or trailing side 82 of the pocket to be absolutely sure that, after tube 88 is inserted therein, the tube does not interfere with direct contact of the trailing side 76 of post 62 and the wall of pocket 70 on its trailing side 82. Indeed, if recess 86 is positioned generally on the forward or leading side 80 of pocket 70 as shown, it may even aid in displacing post 62 toward the rear or trailing side of the pocket.

However, to further ensure such displacement, and to more firmly temporarily hold the post 62 in pocket 82, a spring in the form of roll pin 90 is provided. As in the preceding embodiment of the brazing method, the roll pin 90 is disposed in another recess 92 of pocket 70 which is offset or displaced from trailing side 82. In this case, recess 92 is located in the center of the forward or leading face 80 of the pocket whereby a single roll pin 92 may be used to resiliently bias post 62 to the rear. Roll pin 90 may be cast into the bit body 72, whereby it forms its own recess 92, or the recess 92 may be preformed and the pin 90 subsequently installed therein.

In any event, post 62 is then installed in pocket 70, brazing material 94 is emplaced in tube 88, and tube 88 with the enclosed brazing material 94, is inserted into recess 86 with its inner end extending to a point near the bottom of pocket 70. Similar assembly procedures are followed for each respective cutter device 60 and pocket 70 on the bit body member or crown, and the tubes 88 are bent as needed so that each has a substantial part of its outer portion extending generally vertically upwardly by a distance sufficient to induce the necessary hydraulic head. The brazing process is then completed by heating the assembly in a reducing atmosphere, recooling the assembly, and cutting off the outer portions of tubes 88, all as described hereinabove.

FIGS. 9 and 10 illustrate a further embodiment of the brazing method, which like the embodiment described in connection with FIGS. 7 and 8, is intended for use with the improved form of cutter device 60. In the embodiment of FIGS. 9 and 10, the pocket 96 of the bit body member 98 is similar to the pocket 70 of FIGS. 7 and 8 in that it includes forward and rear arcuate sides 100 and 102 and flat lateral sides 104 so that it generally mates with the external configuration of the stud portion of post 62. However, pocket 96 has only a single offset recess 106, which is located in the center of the leading side 100 of the pocket, and is sized to receive a brazing tube 108.

In this variation of the method, a roll pin 110 is inserted into one end, destined to be the inner end, of a brazing tube 108. Then, brazing material 112 is inserted in tube 108 behind roll pin 110. Depending upon the circumference of the brazing material 112 and on other factors, the brazing material may extend into the interior of the roll pin, or it may terminate just above the roll pin as shown. In any event, tube 108 with its contents is then inserted into recess 106 and temporarily held in place.

Next, the stud portion of post 62 is inserted in pocket 96. Tube 108 may be bent slightly in the lateral direction as needed to clear the inner edges of carrier 64 and diamond layer 66. Insertion of post 62 may tend to collapse tube 108, but roll pin 110 will tend to expand the inner end of tube 108, thereby not only establishing a free flowway for the brazing material 112, but also displacing post 62 toward the trailing side 102 of pocket 96 while also temporarily retaining the post in place during completion of the brazing procedure. The process is then completed as for the foregoing embodiments.

Numerous other variations of the exemplary forms of the invention described hereinabove are within the spirit of the invention. It is therefore intended that the scope of the invention be limited only by the claims which follow. Further, it is specifically noted that, in the method claims, recitation of steps in a given order is not intended to imply that the steps must be performed in that order, unless such order is further indicated by terms such as "first," "next," "then," "subsequently," or the like.

What is claimed is:

1. A method of mounting a cutter device, having a stud portion defining one end thereof and a cutting formation generally adjacent the other end, in a pocket in a drill bit body member, said method comprising the steps of:
    forming channel means extending into said pocket by inserting a channel member into said pocket adjacent a side wall thereof;
    inserting brazing material into said channel means;
    inserting said stud portion of said cutter device into said pocket;
    then heating said bit body member to cause said brazing material to flow through said channel means into said pocket;
    then re-cooling said bit body member.

2. The method of claim 1 wherein said channel member has an inner portion which is inserted into said pocket and an outer portion which is allowed to extend out of said pocket away from said bit body member for a substantial distance.

3. The method of claim 2 comprising using, as at least the outer portion of said channel member, a tube of material with a melting point higher than that of said brazing material.

4. The method of claim 3 comprising orienting said bit body member and said outer portion of said tube so that at least a substantial part of said outer portion of said tube extends generally upwardly during said heating.

5. The method of claim 2 comprising using as said channel member an integral tube with a melting point higher than that of said brazing material.

6. The method of claim 5 wherein said inner portion of said tube is inserted to a point near the bottom wall of said pocket.

7. The method of claim 6 wherein said brazing material is inserted into said tube before said tube is inserted into said pocket.

8. The method of claim 6 wherein said brazing material is inserted into said tube to a point near the inner end of said tube.

9. The method of claim 5 wherein a plurality of such cutter devices are so mounted in respective pockets in said bit body member, and wherein the outer portions of at least some of said tubes are bent so that substantial parts of the outer portions of all of said tubes are oriented generally parallel to one another.

10. The method of claim 9 comprising orienting said bit body member so that said parallel parts of said outer portions of said tubes extend generally upwardly during heating.

11. The method of claim 5 comprising displacing said stud portion of said cutter device toward a trailing side of said pocket prior to heating.

12. The method of claim 11 wherein said tube is inserted so as not to prevent contact of said stud portion of said cutter device with the wall of said pocket generally on said trailing side.

13. The method of claim 12 wherein said cutter device has an external groove extending along the length of said stud portion; and wherein said tube is inserted into said groove.

14. The method of claim 13 comprising forming an internal longitudinal groove along the trailing side of said pocket;
    orienting said stud portion in said pocket with said grooves opposed to each other;
    and inserting said tube in said opposed grooves.

15. The method of claim 12 comprising forming said pocket with an offset recess distal said trailing side;
and inserting said tube in said offset recess.

16. The method of claim 15 comprising
positioning said offset recess to oppose a surface of said stud portion which faces at least partially in a leading direction;
and emplacing a spring in the inner portion of said tube for so displacing said stud portion by resilient biasing.

17. The method of claim 1 comprising installing spring means cooperative between said cutter device and said bit body member for retaining said stud portion in said pocket during said heating.

18. The method of claim 17 wherein said spring means is further operative to displace said stud portion toward a trailing side of said pocket.

19. The method of claim 18 comprising forming said pocket with an offset recess distal said trailing side;
and installing said spring means in said offset recess.

20. The method of claim 19 comprising casting said spring means into said bit body member.

21. The method of claim 19 comprising using as said spring means a roll pin oriented parallel to said pocket.

22. The method of claim 1 wherein said brazing material comprises a brazing metal.

23. The method of claim 22 wherein said brazing material further comprises a flux.

* * * * *